J. H. KOONTZ.

Improvement in Tie Lifters.

No. 124,749.  Patented March 19, 1872.

Witnesses.

Inventor.

124,749

UNITED STATES PATENT OFFICE.

JACOB H. KOONTZ, OF YORKTOWN, INDIANA.

IMPROVEMENT IN TIE-LIFTERS.

Specification forming part of Letters Patent No. 124,749, dated March 19, 1872.

Specification describing a certain Improvement in Tie-Lifters, invented by JACOB H. KOONTZ, of Yorktown, in the county of Delaware and State of Indiana.

This invention relates to a device which is designed to be used for loading and unloading ties for railroad tracks, or pieces of timber for any other purpose, and also for raising ties when they have been placed in the track for the purpose of bringing them to the proper level or for removing them from their beds to allow new ones to be put in their places; and it consists in an instrument for that purpose, the novelty of which will be more fully described hereinafter.

Figure 1:
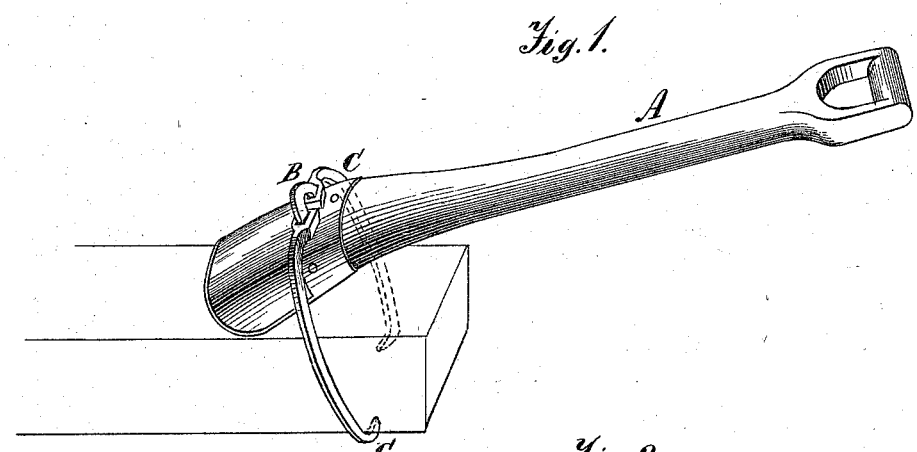
Figure 2:
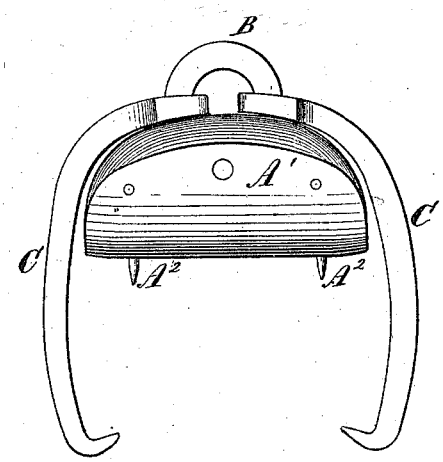

Figure 1 is a perspective view of my improved lifter and a portion of a railroad tie, showing its application to such tie for lifting or carrying it. Fig. 2 is an end view.

Corresponding letters refer to corresponding parts in both figures.

In constructing implements of this character I use a handle, A, constructed substantially as shown in Fig. 1, it being made of some strong and hard wood, its outer end being provided with an open handle or not, as preferred. The opposite end of this handle is widened, as shown in Fig. 2, for the purpose of giving it a broad bearing on the timber to be lifted, it being protected by a plate of metal, $A^1$, which may be secured thereto by screws or in any other suitable manner. In the plate $A^1$ just alluded to there are placed two or more pointed pins, $A^2$ $A^2$, which project outward from said plate, as shown in Fig. 2, for the purpose of preventing it from slipping when it is being used. Upon the upper surface of the handle A, and near that end which rests upon the timber to be raised, there is fixed a staple or eye, B, to which the upper ends of the hooks C C are attached by having the staple passed through apertures in their ends, as shown in Fig. 2 of the drawing. These hooks are bent so as to pass down by the sides of the handle A, and below its lower surface for a distance sufficient to permit the lower sharpened ends to pass under the timber to be raised, or to permit such sharpened and bent ends to be forced into the sides of such timber for the purpose of raising it.

This implement is applied by placing its broad and plated end upon the timber to be raised and allowing the hooks to grapple such timber, when, by lifting the outer end, the timber will be raised. When it is to be used for raising the ends of railroad ties for the purpose of allowing the operator to tamp the earth under them, a brace may be used, which, if placed under its outer end, with its lower end resting upon the earth, will retain the tie in its elevated position while the tamping process is being performed.

What I claim as my invention, and desire to secure by Letters Patent, is—

1. The combination of the handle A and the hooks C C, said hooks being directly connected to the handle, substantially as and for the purpose set forth.

2. The combination of the metal plate $A^1$ with its projecting points $A^2$ $A^2$ and the handle or lever A, substantially as and for the purpose set forth.

In testimony whereof I have signed my name to this specification in the presence of two subscribing witnesses.

J. H. KOONTZ.

Witnesses:
T. M. HARDWICK,
JONAS HANEY.